June 25, 1946. W. J. MILLER 2,402,656
APPARATUS FOR USE IN MANUFACTURING POTTERYWARE
Original Filed Jan. 13, 1944  3 Sheets-Sheet 3
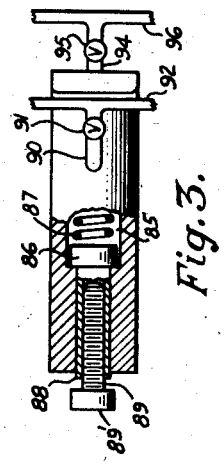
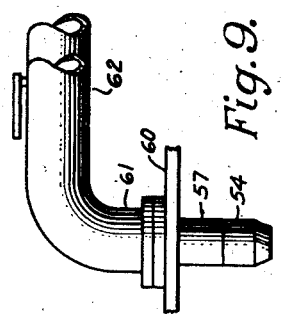
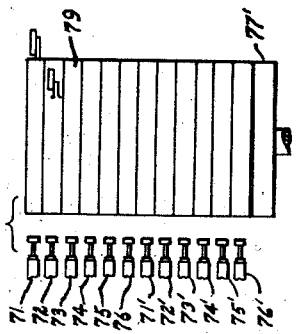
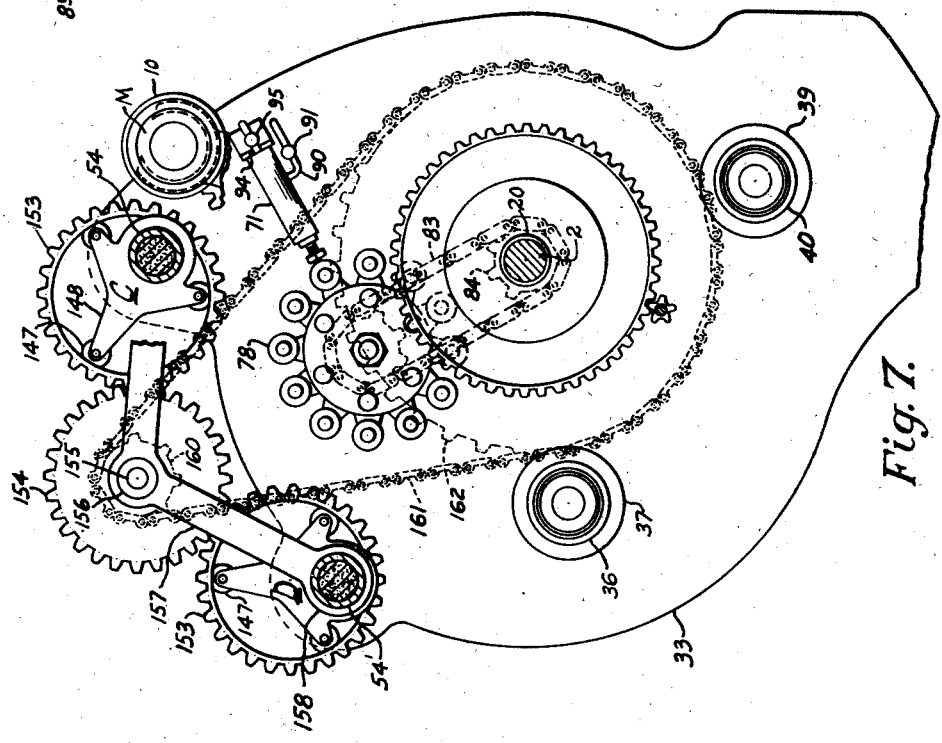
INVENTOR.
William J. Miller
BY
George J. Cieminger
ATTORNEY.

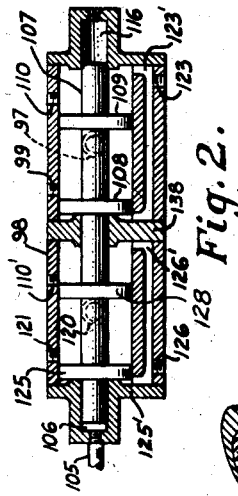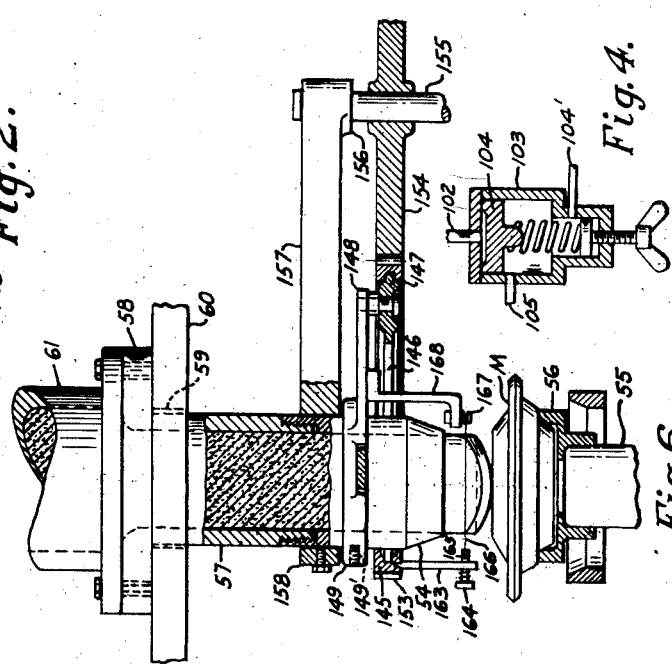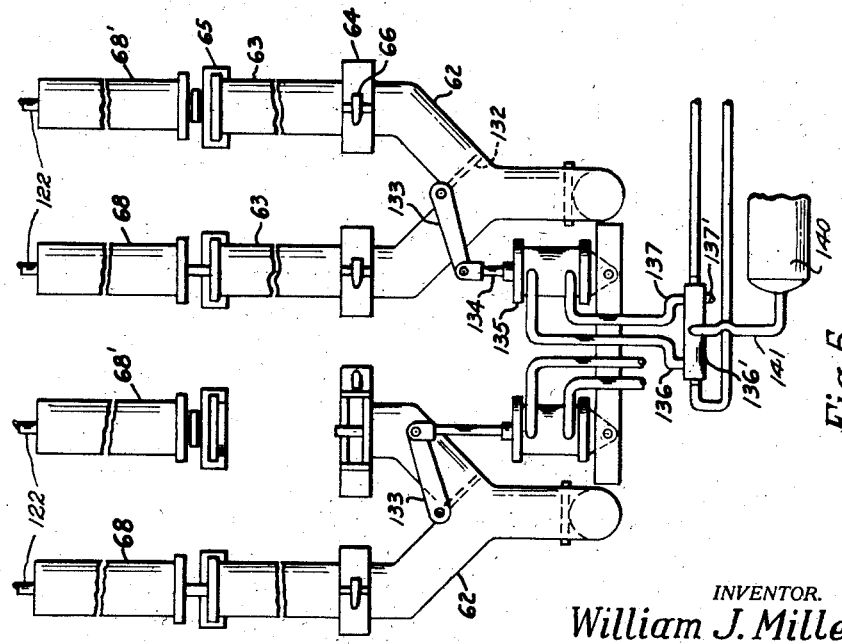

Patented June 25, 1946

2,402,656

UNITED STATES PATENT OFFICE 2,402,656

APPARATUS FOR USE IN MANUFACTURING POTTERYWARE

William J. Miller, Swissvale, Pa., assignor to Miller Pottery Engineering Company, Swissvale, Pa., a corporation of Pennsylvania Original application January 13, 1944, Serial No. 518,079. Divided and this application January 28, 1944, Serial No. 519,994

10 Claims. (Cl. 25—22)

This is a division of my application Serial Number 518,079, filed January 13, 1944.

This invention relates to apparatus for manufacturing pottery ware. It has to do with automatic machinery for feeding clay to plaster molds in making dinnerware articles and the like automatically.

In certain types of automatic dinnerware forming machinery having an intermittently rotating mold table, for instance that disclosed in the patent to W. H. Emerson, 2,321,471, the molds are carried in the mold forks thereof in single file to the feeding station, where disc-like blanks of clay are cut off from a column of clay and fed thereto and then to a pressing and a jiggering station where the blanks are spread over the ware forming surface and profiled respectively. Only articles having the same form are made in succession in the single line of production which may contain several thousand molds, because there is only one die and one profile, serving the line.

To change the production to some other form of ware requires exchanging the die, profile tool and all of the molds besides making certain adjustments to feeding preforming, jiggering apparatus as well as other operating parts of the machinery. Where the amount and kind of ware to be made on the machinery during the day's operation is even moderately diversified, the production time lost making changeovers may result in serious depreciation in the savings in the cost of manufacture of the ware. In the majority of commercial potteries there is considerable variation daily, in the amount and kind of ware made because of differences in the consist of an ordinary dinnerware set and differences in the form of the consist as between dinnerware sets it being characteristic of the industry to provide a large variety of shapes from which to select.

One object of this invention is to periodically cut off and feed to diverse molds therebelow disclike blanks or charges of clay from intermittently advanced columns of clay of the same or different composition, the diameter and thickness of the charges to be selectively predetermined and varied automatically in accordance with the requirements for the diverse molds and for the products being made;

Another object of this invention is to feed clay from one or the other of a pair of tubes through a single outlet common to both instead of individual outlets, to a continuously operated cut off means above the mold indexing table, and to automatically switch from one tube to the other when one becomes empty to thereby maintain a substantially constant flow of clay to the outlet and eliminate the need for phase changing mechanism customarily employed to maintain the cut off means properly synchronized with the indexing of the mold table, where the feed is switched from one outlet to another;

Other objects and advantageous features will be noted in the following detailed description and drawings, wherein:

Figure 2 is a section view of a changeover valve incorporated in the hydraulic system of Figure 1 for switching the feed from one clay tube to another.

Figure 3 is a detail, partly in section of one of the plunger pumps incorporated in the hydraulic system of Figure 1.

Figure 4 is a section view of a pilot valve incorporated in the hydraulic system of Figure 7.

Figure 5 is a plan view of the twin feed tubes illustrating how clay may be supplied to each from plural magazines.

Figure 6 is a detail in elevation, partly in section of the discharge end of one of the twin feed tubes showing the charge cutting-off means.

Figure 7 is a plan view showing a portion of an automatic jiggering machine with the clay supplying and charge cut off mechanism associated therewith.

Figure 8 is a detail illustrating how the clay magazines are attached to the feed tubes.

Figure 9 is a detail in side elevation of one of the feed tubes of Figure 5 showing the twin supply tubes.

Figure 10 is a diagrammatic illustration of a twelve ring timer and valves for system of Figure 1.

Figure 1:
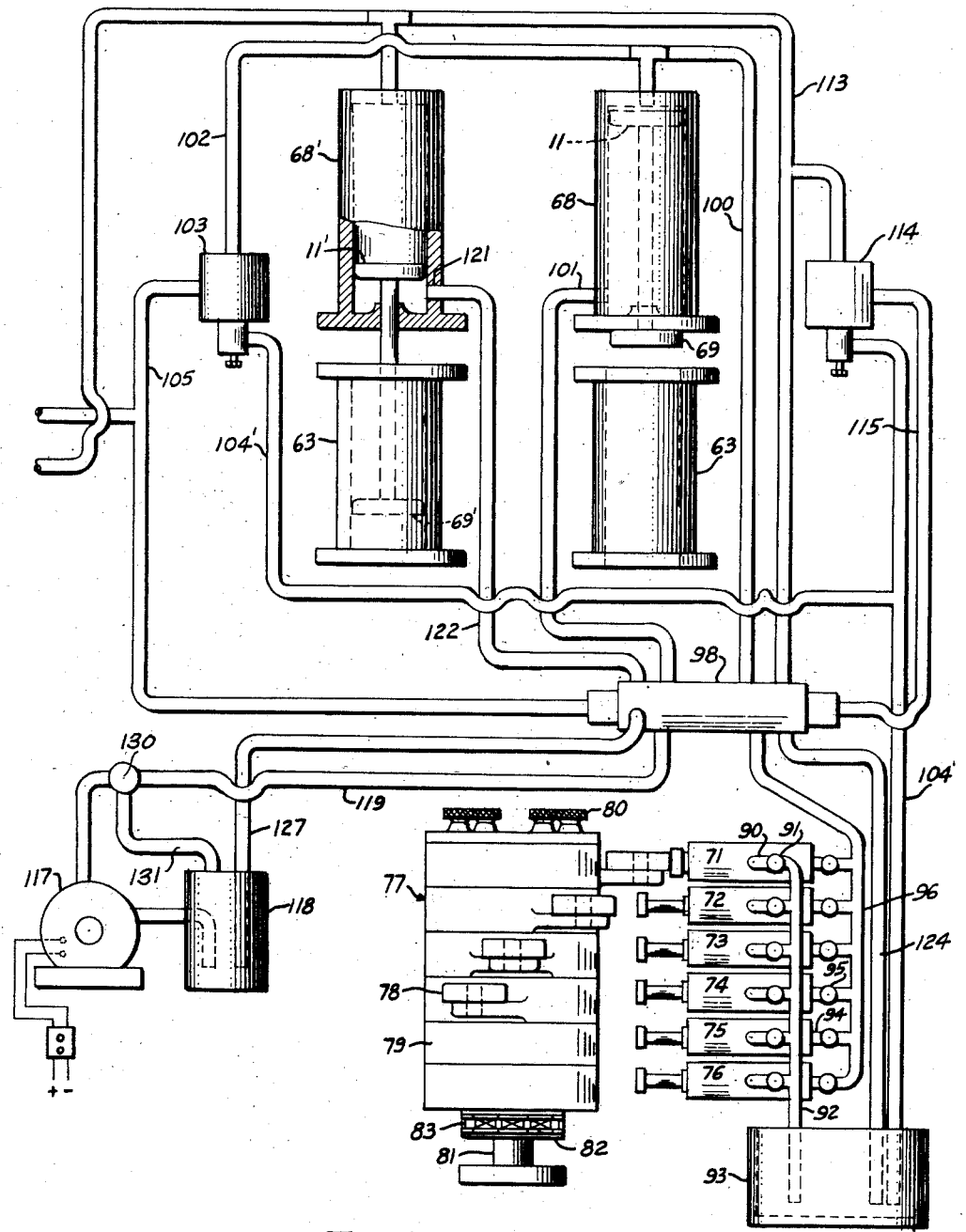
Figure 1 is a piping diagram of the hydraulic system associated with the clay feed tubes.

Empty molds M are transferred by carriers 10 to station C in register with the stationary outlet end of an overhead feed tube 54 Figure 7 and a mold lifter 55 Figure 6 and chuck 56 in which the mold is received, the mold lifter and chuck being like that shown at 36—37 or 39—40 in Figure 7. Due to the production diversification possible and the fact that some molds may require charges of clay of larger diameter or composition than others, I provide another feeding station D where charges may also be fed to the molds. Since both feeding mechanisms are structurally the same only one will be described in detail with the exception of the co-ordinating mechanism that enables automatic alternation of the feeding of charges between the stations specified. This station also has an overhead feed tube 54' Figure 7 and a chuck 56 and mold lifter 55 the same as that shown in Figure 6.

With reference to Figure 6, which illustrates part of the feeder at station C, the feed tube 54 is detachably screwed onto hollow conduit 57 in order that it may be adjusted vertically and/or replaced with tubes having different inside diameters to thereby vary the diameter of the circular charge to be produced. Conduit 57 is flanged at 58 and projects through an oversize hole 59 in support 60 thereby enabling axial adjustment relative to chuck, 56. Conduit 57 is axially aligned with and connected in leakproof sealed relation to the flanged outer end of the vertical section 61 of a hollow, elbow shaped Y tube 62, Figures 2 and 9. Each Y portion of the tube has connected thereto in leakproof sealed relation a replaceable magazine 63 of hollow cylindrical construction, flanged at both ends and supported, by cradles 64 and 65, fore and aft, the front cradles being in the form of a split collar pipe clamp with a lock 66 associated therewith for locking the magazine in feeding position. When a magazine becomes empty, the feed is automatically shifted to the other magazine so that a supply of clay will always be available at the outlet end of tube 54 while the empty magazine is being refilled and replaced. Where it is desired to change the feed from one color or composition of clay to another, the other magazine of a pair may contain another kind of clay answering such specifications and the molds so arranged on the machine as to affect the changeover by the time the other clay reaches the outlet of tube 54.

Each clay feeding station C and D is provided with hydraulically actuated apparatus, including twin rams 68 and 68' for forcing clay from the refill magazines through the feed tubes 54 at each station to the cutting wire therebelow. In the actuation and control of the hydraulic system of each station I propose to employ either a single timer 77', Figure 10, common to both stations C and D or independent timers 77 of the type illustrated in Figure 1 individual to each system. Since the systems are identical and operate alike only one of them has been fully illustrated and described, this being shown in Figure 10 equipped with an individual timer 77 it being understood that in actual practice, the twin rams 68 and 68' of station C, Figure 5, and the twin rams 68 and 68' of station D, would each be provided with the hydraulic system of Figure 1 and operated either with a single timer, Figures 7 and 10, or independent timer, Figure 1. In either event the timer drive is co-ordinated with the rotation of the mold support 10 about the axis of shaft 2 in order to deliver clay to the cut-off wire at stations C and D in timed relation with the presentation of molds at either one or both of said stations.

With reference to Figure 1, the hydraulic system of station C or D comprises a vertical series of six pumps, 71, 72, 73, 74, 75 and 76, to be actuated by a timer 77 having cam rollers 78 mounted on the periphery of cam rings 79 that are angularly adjustable while in operation by means of control knobs 80 as is customary in timers of this type. These pumps control the amount of clay extruded through the feed tubes and regulate the volume of clay contained in individual charges. The rings 79 are rotated together and continuously by means of shaft 81, sprocket 82, Figures 1 and 7, and chain 83, connected to a sprocket 84, fixed on continuously rotating hollow shaft 20 forming a part of the ware fabricating machine 33. The pumps are vertically positioned one over the other although they may, if desired, be spaced circumferentially of the timer.

The timer makes one complete revolution in the same interval of time required for the intermittently rotating spider 5 to make one complete revolution.

Each pump comprises a piston chamber 85, Figure 3, having a piston 86 therein and return spring 87. The piston rod 88 is hollow and threaded to receive a screw 89 which may be screwed outwardly until the head 89' is engaged by one of the cam rollers 78 and then adjusted to regulate the stroke or screwed entirely in to render the pump inoperative. The inlets of all pumps in a set are connected by branch lines 90, each having a check valve 91 therein, to a main header 92 leading to a tank 93 containing hydraulic fluid. The outlets of all pumps in a set are connected by branch lines 94, each having a check valve 95 therein to a main header 96 leading to port 97 of valve 98, Figures 1 and 2, operable to automatically discontinue the clay pumping action of one ram, for instance 68 Figure 5, when the magazine with which it is associated is emptied of clay and start the other ram 70. This is accomplished in the following manner.

The pressure fluid pumped into header 96, Figure 1, by each individual pump forces fluid in the line through port 97 of valve 98 and thence through open port 99 between movable discs 108 and 109 into pipe 100 leading to the piston cylinder of ram 68. As piston 11 advances in cylinder 68, fluid is forced out of said chamber through line 101 and opens port 110' into the valve chamber between movable disc 128 and the stationary central dividing wall 138 of valve 98, and then into passage 126' and out through port 126 into a return line 127 leading to tank 118. When the ram head 69 reaches its forward limit of travel in magazine 63, line 101 is closed by piston 11 and the increase in fluid pressure in line 100 thereupon acts to increase the fluid pressure in line 102 leading to adjustable pilot valve 103, Figure 4, and opens valve 103 by depressing piston 104 against adjustable spring tension thereby opening outlet line 105 leading to piston chamber 106, Figure 2 in the left end of the housing of valve 98. Fluid in the lower part of valve 103 that is displaced by piston 104 enters line 104' leading to tank 93 Figure 1. Pressure fluid entering chamber 106, Figure 2, shifts piston rod 107 to the right thereby causing disc 108 fixed thereon to move to the right of port 110 thereby establishing communication between line 113 leading to the piston cylinder of ram 68' and port 97, Figure 2 connected to the pump line 96, Figure 1.

As piston 11' advances in cylinder 68', fluid is forced out of the chamber through line 122 and port 121 into the chamber between disc 125 and the end wall 125' of valve 98 and then into passage 126' and port 126 into return line 127. When piston 11' reaches its limit of forward movement the increased pressure in line 113 opens pilot valve 114 (having the same construction as pilot valve 103, Figure 4) permitting fluid under pressure in line 115 to flow into piston chamber 116, Figure 2, and shift piston rod 107 to the left to again connect line 100 to pressure pumps 71—76 and start ram 68.

To retract ram head 69' from its magazine 63 when the feed is switched to ram 68 a motor driven pump 117, Figure 1, forces fluid from tank 118 into line 119 leading to port 120 in valve 98 and thence through port 121 into line 122 leading to cylinder 68'. This forces piston 11' to the opposite side thereof being forced through line 112 and port 110 into valve 98 and then through passage 123' and port 123 into line 124 which discharges into tank 93. When the feed is changed from ram 68 to ram 68' the movement of piston rod 107 to the right, Figure 2, shifts disc 125 to the right of port 121 permitting back flow of fluid through line 122, port 121, passage 126', port 126 and return line 127 to tank 118. When piston 11' or 11, either one, reaches the limit of its rearward stroke the increase in pressure in the line 119 opens relief valve 130 and by-passes fluid from the pump into tank 118 through line 131.

It is desired to close off the idle branch of the Y 62 to preclude back extrusion of material therethrough when clay is flowing through the other branch and for this purpose, a pivoted gate 132 is located interiorly of the conduit at the junction of the branches of the Y and is automatically operated from the exterior in the following manner. An arm 133, Figure 5, is attached to the pivot shaft of gate 132 and is pivotally connected to the piston rod 134 of pivotally mounted air cylinder 135. Flexible fluid lines 136 and 137 leading from opposite ends of the cylinder are connected to a valve 136' which is identical with valve 98 except that it has a single chamber as would be represented by the structure on the right side of a dividing partition 138 Figure 2. Thus when changing from ram 68 to ram 70, the increase in pressure in line 105 also increases in line 139, see Figures 1 and 5, to thereby move piston rod 107 from right to left thereby permitting air under pressure to flow from tank 140 through line 141, valve 136', and the line 136 into cylinder 135 to move the piston toward the opposite end of the cylinder and swing gate 132 to the position shown in dotted lines closing off the right branch of the Y. Line 137 is vented to atmosphere through port 137' in said valve 136'. When changing from ram 68' to ram 68, the increase in pressure in line 102 is effective through line 142 to reverse valve 136' and connect line 137 to tank 140 pressure thereby reversing the movement of the piston in cylinder 135 and swinging gate 132 into position to close off the left branch of the Y and open the right branch.

Each pump may be individually regulated and set while the machine is at rest or in operation to deliver a predetermined amount of incompressible fluid proportionally equal to the amount of incompressible clay to be extruded past the cutting off point. For instance, pump 71 may be set to deliver an 8 oz. charge and so on or all may be set to deliver charges of equal weight depending on the production.

Where it is desired to employ only one timer to control the feed at stations C and D, a timer 77', Figure 10, having twelve rings but otherwise identical with the timer 77, may be employed. In this event the pumps 71 to 76 inclusive of the hydraulic system associated with station C would be located above and in vertical alignment with a lower set of pumps 71' to 76' inclusive associated with the hydraulic system for the rams of station D which, as explained before, is identical with that shown in Figure 1.

Thus with either a dual or single timer arrangement many variations in the feeding of charges of clay to molds at either one or both stations is possible. For instance, all the charges to be fed a given group of molds may be applied at either station C or station D if it is desired to feed through one tube only. This might occur where all of the charges have the same diameter and vary only in thickness. If two timers are being employed, the timer not in use may be disconnected from the main drive or if a single 12 ring timer is being employed, six of the cam rollers may simply be removed from their pins to render six pumps inoperative.

In making laminated ware, that is to say ware having two thicknesses of material of different color, composition or co-efficient of expansion, one charge may be fed at station C and another charge deposited on top thereof at station D. The thickness and diameter of either charge may be the same or different depending on the requirements and these specifications of charges to be applied to successive molds of a group could be varied.

Inlaid ware can be produced by utilizing the feeder at station C to apply the desired design to the molding surface first and the feeder at station D to apply the body of the ware over the design which may be of clay having a contrasting color. The feeder at C can easily be converted to produce individual decorative designs of clay by screwing an adapter into the end of the nozzle which has properly formed extrusion holes therethrough to give the extrusion the proper cross sectional shape.

Successive molds in a group may also be fed single charges in succession. This would be accomplished by adjusting the timer to impart two feeding impulses simultaneously, one at each station, and then be idle for the next two movements of the mold support in order to remove the filled molds from the feeding portions and move two empty molds into position for receiving charges of clay. Thus the charges fed to successive molds may vary in diameter, thickness, weight, volume, color and composition.

If desired, the Y 62 may be replaced at both stations C and D by an elbow 57', Figure 8. In this event one of the magazines 63, Figure 1, would be installed at station C and the other at station D. Thus the hydraulic system of Figure 1 would operate to control the feed between two feeding stations rather than between two rams serving a single station. With this arrangement, molds are fed with clay at station C until the magazine 63 thereat is emptied of clay, and then the clay feed is automatically switched to station D.

The clay issuing from tubes 54 at stations C and D is cut off and deposited on the molds by the following apparatus: surrounding each nozzle 54 is a ring gear 145, Figure 6, whose axis is eccentric to that of the nozzle. The inside periphery of each ring 145 has a groove 146 in which three angularly spaced rollers 147, Figure 7, are received. These rollers are carried by a spider 148 having a hub 149 sleeved on the tube and secured thereto by set screw 149' to thereby support the rings 145 for rotation about axis that are eccentric to the vertical axis of the tubes 57 at stations C and D.

To rotate rings 145, each is provided with an externally toothed surface 153 which meshes with a gear 154 between the two fixed on a vertical drive shaft 155, Figures 7 and 6, journaled at the upper end in a bearing 156 in a supporting frame 157, having attaching collars 158 at the extremities to be sleeved on the feed tubes 57 at C and D. The lower end of shaft 155, is journaled in a bearing outside the main housing of machine 33 and is provided with a sprocket 160, Figure 7, driven by chain 161 connected to sprocket 162 fixed on hollow shaft 20 which continuously rotates and thereby continuously rotates ring gears 145.

Screwed into the underside of each ring gear 145 is a post 163, Figure 6, which projects downwardly and carries a horizontal wire tensioning screw 164 with a notch 165 at the end to receive one end of a cutting wire 166. The other end of the wire is attached to a vertical pin 167 freely rotatable in a bracket 168 attached to and depending from one of the spider arms of each spider in such position that pins 167 are located on the axis of rotation of each gear 145. Thus, as each ring is rotated, each cutting wire is caused to pass below the nozzle 54 with which it is associated once for every complete revolution of the ring gear to which it is attached to thereby sever a charge of clay from the extrusion and deposit said charge on a mold therebelow.

The cutting wires operate continuously regardless of whether the tube is idle or not and they are synchronized with the indexing of molds at the feeding positions and are geared so as to make six complete revolutions to one complete revolution of the upper table 35 and to start the cutting operation incident to the movement of a mold into register with the nozzle 54 at the feeding position or positions.

I claim:

1. Apparatus for feeding plastic material to a cutting off station at a non-uniform rate for making potteryware of different character, comprising a conduit to be filled with plastic material, a plunger for forcing said material out one end of said conduit, a piston for moving said plunger, an hydraulic cylinder housing said piston, a plurality of pumps for pumping liquid into said cylinder to move the plunger forward through said conduit, means for adjusting the stroke of each pump independently of the others to thereby predetermine the amount of material contained in successive charges to be segregated at the cutting off station and means for actuating said pumps.

2. Apparatus for feeding plastic material to a cutting off station, comprising a conduit to be filled with plastic material, a plunger for forcing said material out one end of said conduit, a piston for moving said plunger, an hydraulic cylinder housing said piston, a plurality of pumps for pumping liquid into said cylinder to move the plunger forward through said conduit, and means for actuating said pumps in succession, each pump delivering to said cylinder a quantity of fluid proportional to the amount of material to be contained in a single charge.

3. Apparatus for feeding plastic material to a cutting off station, comprising a conduit to be filled with plastic material, a plunger for forcing said material out one end of said conduit, a piston for moving said plunger, an hydraulic cylinder housing said piston, a plurality of pumps for pumping liquid into said cylinder to move the plunger forward through said conduit, means for actuating said pumps in successive order, each pump delivering to said cylinder a quantity of fluid proportional to the amount of material to be contained in a single charge, means for varying the quantity of fluid delivered by each pump to thereby vary the volume of material contained in each successive charge and actuating means for said pumps having means for varying the time of delivery of fluid of each pump independently of the others.

4. Apparatus for feeding plastic material to a cutting off station comprising a conduit to be filled with plastic material, a plunger for forcing said material out one end of said conduit, a piston for moving said plunger, an hydraulic cylinder housing said piston, pumping means for pumping liquid into said cylinder to move the plunger forward through said conduit and means for varying the quantities of fluid delivered in successive impulses of the pumping means to thereby vary the volume of material contained in successive charges.

5. Apparatus for feeding plastic material to a cutting off station comprising a conduit to be filled with plastic material, a plunger for forcing said material out one end of said conduit, a piston for moving said plunger, an hydraulic cylinder housing said piston, pumping means for pumping liquid into said cylinder to move the plunger forward through the conduit, means for varying the quantities of fluid delivered in successive impulses of the pumping means to thereby vary the volume of material contained in successive charges and means for regulating the time of delivery of the successive quantities of fluid.

6. Apparatus for extruding a column of plastic clay for segregation into a plurality of separate charges of non-uniform volume for making potteryware of different character comprising a tubular member for housing a body of plastic clay and having a discharge outlet at one end, a plunger in said tubular member, a piston for moving said plunger forward to extrude clay through said discharge outlet, an hydraulic cylinder housing said piston, variable stroke hydraulic pumping means operable to deliver to said cylinder different quantities of fluid for successive strokes in a predetermined cycle of strokes whereby charges of non-uniform volume are extruded in succession in successive series.

7. Apparatus for feeding material to a cutting off station comprising a pair of tubular members arranged to discharge through a common outlet, a gate in each tubular member, a pair of plungers for forcing material out of said tubular members, liquid pumping means for moving the plungers forwardly alternately independently of each other, and means actuated by a momentary increase in hydraulic pressure caused by one of the plungers reaching the forward limit of its stroke for retracting the plunger and closing the gate in the tubular member associated therewith so that said tubular member can be recharged with clay while the other plunger is forcing clay out of the other tubular member.

8. Apparatus for feeding material to a cutting off station comprising a pair of tubular members arranged to discharge through a common outlet, a gate in each tubular member, a pair of plungers for forcing material out of said tubular members, liquid pumping means for moving the plungers alternately independently of each other to force clay from said tubular members, and means operable in response to a momentary increase in hydraulic pressure caused by one of the plungers reaching the forward limit of its stroke to close one of said gates and open the other and connect the other plunger to the liquid pumping means.

9. Apparatus for feeding charges of plastic ceramic material to a line of molds continuously from two stations comprising a conduit at each station having a single outlet, and an inlet, a plunger mounted in alignment with each inlet, a tubular magazine connected to each inlet adapted to receive a plunger for forcing clay from said magazines through said outlets, a plurality of liquid pumps for moving each plunger forwardly through the magazine with which it is associated and means for actuating the pumps of each station independently of the pumps of the other station.

10. The combination with an automatic potteryware fabricating machine having a movable mold carrier and a cutting wire synchronized with the movement of the mold carrier of apparatus for feeding clay to the cutting wire to be segregated into charges and deposited on successively presented molds comprising a conduit having an extrusion outlet above said cutting wire, a tubular member to be filled with clay, a plunger for forcing clay from said tubular member into the conduit, liquid pumping means for delivering a given quantity of fluid each stroke of the pumping means to force an amount of material from the conduit equal to one mold charge and means for changing the time of delivery of the pump relative to the stroke of the cutting wire.

WILLIAM J. MILLER.